(12) United States Patent
Harrison et al.

(10) Patent No.: US 8,842,839 B2
(45) Date of Patent: Sep. 23, 2014

(54) DEVICE WITH MULTIPLE ONE-TIME PADS AND METHOD OF MANAGING SUCH A DEVICE

(75) Inventors: Keith Alexander Harrison, Bristol (GB); William John Munro, Bristol (GB); Christopher Tofts, Bristol (GB); Timothy Paul Spiller, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2387 days.

(21) Appl. No.: 11/490,853

(22) Filed: Jul. 21, 2006

(65) Prior Publication Data

US 2008/0031456 A1 Feb. 7, 2008

(30) Foreign Application Priority Data

Sep. 29, 2005 (GB) .................................. 0519842.9
Oct. 31, 2005 (GB) .................................. 0522092.6

(51) Int. Cl.
*H04L 9/00* (2006.01)

(52) U.S. Cl.
USPC ............... 380/278; 380/46; 380/49; 713/171; 713/169

(58) Field of Classification Search
USPC ...................... 380/278, 46, 49; 713/171, 169
See application file for complete search history.

(56) References Cited

U.S. PATENT DOCUMENTS

| | | | |
|---|---|---|---|
| 5,266,942 A | 11/1993 | Stoller | |
| 5,483,598 A | 1/1996 | Kaufman | |
| 5,515,438 A | 5/1996 | Bennett et al. | 380/278 |
| 5,729,717 A | 3/1998 | Tamada et al. | |
| 5,764,767 A | 6/1998 | Beimel | |
| 5,999,285 A | 12/1999 | Brandt et al. | 398/212 |
| 6,021,203 A * | 2/2000 | Douceur et al. | 380/252 |
| 6,101,255 A | 8/2000 | Harrison | |
| 6,266,413 B1 | 7/2001 | Shefi | |
| 6,345,359 B1 | 2/2002 | Bianco | |

(Continued)

FOREIGN PATENT DOCUMENTS

| | | |
|---|---|---|
| EP | 1075108 | 2/2001 |
| EP | 1470660 | 10/2004 |

(Continued)

OTHER PUBLICATIONS

Chris Christensen, One-time Pad (OTP), Fall 2005, Crptology Notes.*

(Continued)

*Primary Examiner* — Jeffrey Pwu
*Assistant Examiner* — Samuel Ambaye

(57) ABSTRACT

A device is arranged to carry out security-related tasks using one-time pad data. The device has a memory for holding multiple one-time pads, each pad having a different security rating and being intended for use by the device in executing a task to that security rating. Provisioning of the pads with one-time pad data involves carrying out a process for obtaining new secret random data. This process has a security rating with the value of this rating varying according to the nature and parameters of the process concerned. The security rating of the process used to obtain the new secret random data is matched to that of the pad to be provisioned with one-time data, or the other way around, such that the security rating of the process is as least as good as that of the pad to be provisioned.

20 Claims, 5 Drawing Sheets

(56) References Cited

U.S. PATENT DOCUMENTS

| | | |
|---|---|---|
| 6,364,834 B1 | 4/2002 | Reuss |
| 6,445,794 B1 * | 9/2002 | Shefi .............................. 380/46 |
| 6,748,083 B2 * | 6/2004 | Hughes et al. ................ 380/278 |
| 6,802,000 B1 | 10/2004 | Greene et al. |
| 7,036,020 B2 | 4/2006 | Thibadeau |
| 7,099,478 B2 | 8/2006 | Tomlinson |
| 7,571,320 B2 * | 8/2009 | Davis ........................... 713/169 |
| 7,676,681 B2 | 3/2010 | Dillon et al. |
| 2002/0002675 A1 | 1/2002 | Bush |
| 2002/0133533 A1 | 9/2002 | Czajkowski |
| 2002/0146119 A1 | 10/2002 | Liss |
| 2002/0159601 A1 | 10/2002 | Bushmitch |
| 2003/0016821 A1 | 1/2003 | Hammersmith |
| 2003/0026431 A1 | 2/2003 | Hammersmith |
| 2003/0039357 A1 | 2/2003 | Alten |
| 2003/0142821 A1 | 7/2003 | Ross |
| 2003/0149869 A1 | 8/2003 | Gleichauf |
| 2004/0247130 A1 | 12/2004 | Koike |
| 2004/0249503 A1 | 12/2004 | Sanchez |
| 2005/0105734 A1 | 5/2005 | Buer |
| 2005/0190923 A1 | 9/2005 | Noh |
| 2006/0059343 A1 * | 3/2006 | Berzanskis et al. ........... 713/171 |
| 2006/0059347 A1 | 3/2006 | Herz |
| 2006/0080545 A1 | 4/2006 | Bagley |
| 2006/0265595 A1 | 11/2006 | Scottodiluzio |
| 2007/0005955 A1 | 1/2007 | Pyle |
| 2007/0061865 A1 | 3/2007 | Bermudez et al. |
| 2009/0207734 A1 | 8/2009 | Stultz |

FOREIGN PATENT DOCUMENTS

| | | |
|---|---|---|
| EP | 1506636 | 2/2005 |
| WO | WO-0131840 | 5/2001 |
| WO | WO-0174005 | 10/2001 |
| WO | WO-03098868 | 11/2003 |
| WO | WO-2004073234 | 8/2004 |
| WO | WO-2005083610 | 9/2005 |

OTHER PUBLICATIONS

Bennett, C.H., et al., "Generalized Privacy Amplification", IEEE Transactions on Information Theory, vol. 41, No. 6, pp. 1915-1923 (Nov. 1995).

* cited by examiner

DISTRIBUTED SYSTEM

DEVICE WITH MULTIPLE ONE-TIME PADS AND METHOD OF MANAGING SUCH A DEVICE

FIELD

The present specification describes examples of a device with multiple one-time pads and to a method of managing such a device.

BACKGROUND

As is well known, two parties that posses the same secret random data can provably achieve both unbreakable secure communication using the Vernam cipher, and discrimination between legitimate messages and false or altered ones (using, for example, Wegman-Carter authentication). In both cases, however, data used from the secret random data shared by the parties must not be re-used. The term "one-time pad" is therefore frequently used to refer to the secret random data shared by the parties and this term, or its acronym "OTP", is used herein for secret random data shared by more than one party. Although for absolute security the one-time pad data must be truly random, references to one-time pads (OTP) herein includes secret data that may not be truly random but is sufficiently random as to provide an acceptable degree of security for the purposes concerned.

The fact that the OTP data is effectively consumed when used gives rise to a major drawback of the employment of OTP cryptographic systems, namely that the OTP must be replenished.

One approach to sharing new OTP data between two parties is for one party to generate the new OTP data and then have a copy of the data physically transported in a storage medium to the other party. This is costly to do, particularly where it needs to be done frequently; furthermore, it may not be feasible to adopt this approach (for example, where one of the parties is a communications satellite).

Another approach is to send the OTP data over a communications link encrypted using a mathematically-based encryption scheme. However, this approach effectively reduces the security level to that of the encryption scheme used; since no such schemes are provable secure and may well prove susceptible to attack as a result of advances in quantum computing, this approach is no better than replacing the intended OTP system with a mathematically-based scheme.

More recently, quantum key distribution (QKD) methods and systems have been developed which enable two parties to share random data in a way that has a very high probability of detecting any eavesdroppers. This means that if no eavesdroppers are detected, the parties can have a high degree of confidence that the shared random data is secret. QKD methods and systems are described, for example, in U.S. Pat. No. 5,515,438 and U.S. Pat. No. 5,999,285. In known QKD systems, randomly polarized photons are sent from a transmitting apparatus to a receiving apparatus either through a fiber-optic cable or free space.

As a consequence of the actual and perceived problems of sharing secret random data, OTP cryptographic systems have generally only been used in applications where the security requirements are paramount such as certain military and government applications.

Because OTP cryptography is generally only employed where very high security is needed, the types of system where it is used are those where other components of the overall system do not significantly compromise the level of security provided by OTP cryptography. In particular, there is little point in using OTP cryptography for passing secret messages between parties if the messages are to be stored or subsequently transmitted in a manner that is significantly less secure. Furthermore, the storage of the OTP data itself represents a security threat and unless the OTP data can be stored in a highly secure manner, it is better to share OTP data only at a time immediately before it is to be consumed.

SUMMARY

OTP data can usefully be employed in systems with less than the highest levels of security and in such cases it is possible share OTP data more flexibly.

By way of example, the present specification describes a method of managing a device arranged to carry out security-related tasks using one-time pad data, the method comprising:
  holding a plurality of one-time pads, each pad having a different security rating and being intended for use by the device in executing a task to that security rating,
  obtaining new secret random data by a process with an associated security rating; and
  using the new secret random data to provision a particular said one-time pad with one-time pad data;
the method further comprising matching one of said particular one-time pad and said process to the other of said pad and process such that the security rating of said process is as least as good as that of said particular one-time pad.

By way of example, the present specification further describes a device comprising:
  a memory for holding multiple one-time pads each with a different security rating,
  a provisioning arrangement for carrying out a process to obtain new secret random data and for using this data to provision a particular said one-time pad with one-time pad data, the provisioning arrangement being arranged to match one of said particular one-time pad and said process to the other of said pad and process such that the security rating of said process is as least as good as that of said particular one-time pad; and
  a consumption arrangement for carrying out a security-related task using a said one-time pad with a security rating suitable for said task.

BRIEF DESCRIPTION OF THE DRAWINGS

Embodiments of the invention will now be described, by way of non-limiting example, with reference to the accompanying diagrammatic drawings of embodiments of the invention, in which.

DETAILED DESCRIPTION

Figure 1:
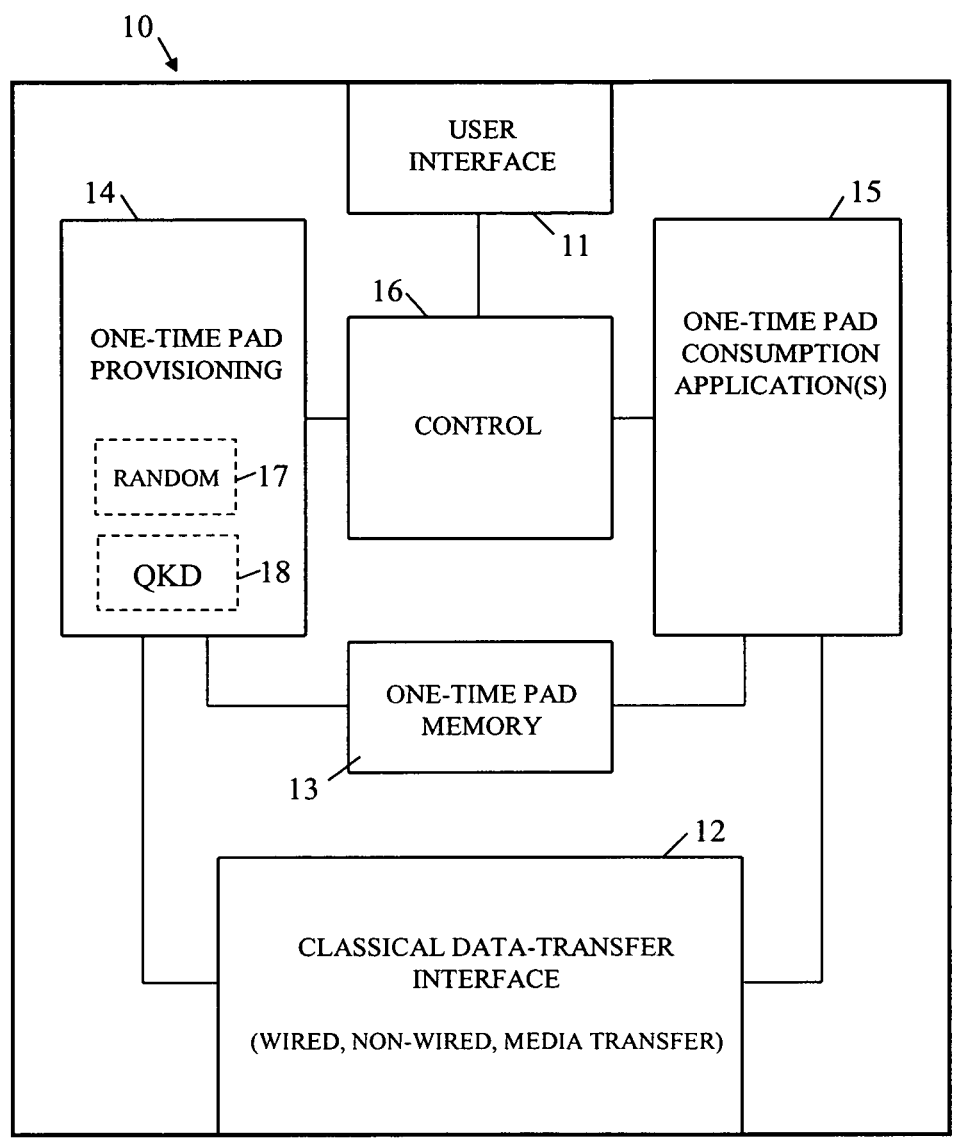
FIG. 1 is a diagram of a generalised form of user OTP device used in embodiments of the invention.

FIG. 1 shows, in generalized form, a user OTP device 10 for storing and using one-time pad data for various applications such as, for example, encryption and identification. Preferred embodiments of the device 10 are portable in form and are, for example, constituted by hand-held devices such as mobile phones and PDAs; however, other embodiments of the apparatus 10 can be of non-portable form such as a personal desktop computer.

In use, the OTP device 10 is intended to communicate with OTP apparatus having access to the same secret random data as the device 10 in order to conduct an OTP interaction (that is, an interaction requiring use of the same OTP data by the device and apparatus). Such OTP apparatus is hereinafter referred to as the "complementary OTP apparatus" with respect to the device 10; this apparatus can be of the same general form as the user OTP device 10 or can be of a different form and/or form part of a distributed system as will be described more fully hereinafter. Generally, the complementary OTP apparatus will be shown with a circular boundary in the Figures and will be referenced '20'.

The User OTP Device 10

The user OTP device 10 comprises the following functional blocks:
- a user interface block 11 for interfacing with a user;
- a classical data-transfer interface 12 for transferring data to and/or from external entities by wired or non-wired means, or by media transfer;
- a memory 13 for storing OTP data;
- an OTP provisioning block 14 which, through interaction with an external entity, is arranged to provide new secret random data for initializing or replenishing the memory 13 with OTP data;
- an OTP consumption block 15 for carrying out one or more applications that consume OTP data stored in memory 13; and
- a control block 16 for controlling and coordinating the operation of the other blocks in response to inputs received through the user interface 11 and the data-transfer interface 12.

Typically, the functional blocks 11 to 16 are implemented using a program-controlled processor together with appropriate specialized sub-systems. Further details of each block are given below for the case where a processor-based system (including a main processor and associated memory) is used to carry out at least most of the data processing tasks of the device 10, such tasks including, in particular, the control and coordination tasks of control block 16 and the running of the security applications embodying the OTP consumption block 15.

User Interface 11

The user interface 11 typically comprises an LCD display and an input keypad but may also include audio input and/or output means.

Classical Data-Transfer Interface 12

The classical data-transfer interface 12 can comprise a non-wired interface such as a Bluetooth (Trademark) wireless interface or an IrDA infrared interface; however, a wired interface can alternatively or additionally be provided such as an USB interface (as used herein, the term "wired" is to be understood broadly to cover any type of interface that requires electrical elements to be brought into physical contact). For circumstances where transit delay is not an issue, it is also possible to implement the data-transfer interface 12 as a removable storage medium and related read/write arrangement.

OTP Memory 13

The OTP memory 13 can be part of the general memory associated with the main processor of device 10 or can be formed by a separate memory. In either case, the OTP data is preferably secured against unauthorized access by one or more appropriate technologies. For example, the memory 13 can all be provided in a tamper-resistant hardware package. Alternatively, a protected storage mechanism can be used in which all but the root of a hierarchy (tree) of encrypted data objects is stored in ordinary memory, the root of the hierarchy being a storage root key which is stored in a tamper-resistant hardware package and is needed to decrypt any of the other data objects of the hierarchy. Furthermore, trusted platform techniques can be used to ensure that only authorized software can access the OTP data. It is also possible to use QRAM (Quantum RAM) technologies.

Where the device 10 is designed such that OTP data is consumed immediately following its provisioning, the security requirements of memory 13 can be reduced (unless the device 10 is designed to operate unattended).

OTP Provisioning Block 14

With regard to the OTP provisioning block 14, the most secure way to share secret random data is to use a quantum key distribution method such as described in the documents referenced in the introduction to the present specification. In this case, the OTP provisioning block is provided with a QKD subsystem 17 that can be either a QKD transmitter or a QKD receiver. It is relatively straightforward to incorporate a QKD transmitter within a hand-held device and then to provide a cradle or similar mechanical arrangement to ensure that the device is properly optically aligned to interact with a fixed QKD receiver subsystem. In fact, it is possible to dispense with a mechanical alignment arrangement by the use of an automated or semi-automated alignment system such as is disclosed in our co-pending U.S. patent application Ser. No. 11/454,632 filed 16 Jun. 2006.

Figure 2A:
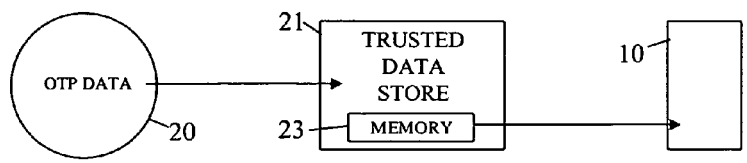
FIG. 2A is a diagram illustrating the use of a trusted data store to transfer OTP data.

The OTP provisioning block 14 need not be built around a QKD subsystem and a number of alternative embodiments are possible. Thus, in one such alternative embodiment the OTP provisioning block 14 is simply be arranged to store to the OTP memory 13, secret random data received via the data-transfer interface 12 from either:

(i) OTP apparatus seeking to share secret random data with the device 10 either directly or via a trusted data store;

(ii) a trusted random data generator that has the role of generating secret random data and passing it both to the user device 10 and to OTP apparatus with which the device 10 is wishing to interact using shared OTP data FIG. 2A illustrates the use of a trusted data store 21 for transferring secret random data to the device 10. In FIG. 2A, secret random data provided by the complementary OTP apparatus 20 is first passed to the trusted data store where it is held in memory 23 before being subsequently transferred to the OTP device 10. The trusted data store 21 can be infrastructure equipment or stand-alone equipment such as a hand-held device.

Figure 2B:
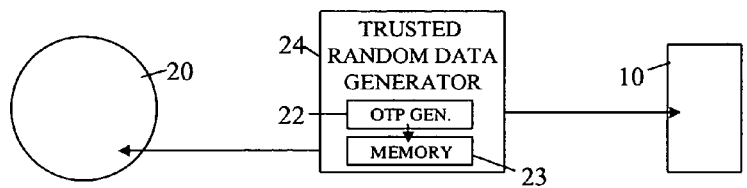
FIG. 2B is a diagram illustrating the use of a first form of trusted random data generator to generate and distribute OTP data.

FIG. 2B illustrates the use of a trusted random data generator 24. The trusted generator 24 includes a random data generation arrangement 22 for generating the random data, this data being generated at a time that the trusted random data generator 24 is in communication with the device 10 so that the random data can be passed immediately to the device 10. The trusted random data generator 24 also stores the random data it has generated in memory 23 and subsequently transfers this data to the complementary OTP apparatus 20. It will be appreciated that the random data could have been generated when the generator 24 was in communication with the apparatus 20 and then subsequently passed by the generator 24 to the device 10. It would also be possible for the generator 24 to only generate random data when in communication both the device 10 and apparatus 20 so that the random data is passed to both immediately, obviating the need for the memory 23. Conversely, the random data could be generated in advance of the trusted random data generator 24 being in communication with either of the device 10 and apparatus 20 in which case the random data is stored in memory 23 and subsequently passed to each of the device 10 and apparatus.

Figure 2C:
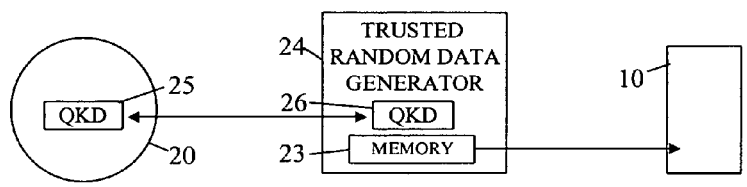
FIG. 2C is a diagram illustrating the use of a second form of trusted random data generator to generate and distribute OTP data.

In the FIG. 2B form of the trusted random data generator 24, the random data is generated by the generator 24 acting alone. FIG. 2C shows a different form of the trusted random data generator 24 in which a QKD arrangement is used to generate the OTP data—in the illustrated scenario, the trusted random data generator 24 includes a QKD transmitter 26 arranged to interact with a QKD receiver 25 in the apparatus 20 in order to generate secret random data. The QKD transmitter 26 and receiver 25 can, of course, be swapped around; furthermore, the OTP data could alternatively be generated by a QKD interaction between the trusted generator 24 and a QKD entity in the device 10. As with the FIG. 2B trusted random data generator 24, the generator 24 of FIG. 2C also includes a memory 23 for storing the generated random data prior to transfer to the device 10 (or to the apparatus 20 if the QKD interaction was with the device 10).

The trusted random data generator 24 can be totally independent of the OTP device 10 and OTP apparatus 20 or can be associated with one of these entities—for example, the trusted random data generator 24 can be run by a bank that also runs the OTP apparatus 20.

Returning now to a consideration of the provisioning block 14 of the device 10, rather than the secret random data being generated using a QKD subsystem or being received by the provisioning block 14 from an external source, the OTP provisioning block 14 can include a random data generator 17 for generating random data which is both used to provision the memory 13 with OTP data, and passed via the data-transfer interface 12 directly or indirectly (including via a trusted data store) to other OTP apparatus with which the device 10 wishes to conduct OTP interactions. The random data generator is, for example, a quantum-based arrangement in which a half-silvered mirror is used to pass/deflect photons to detectors to correspondingly generate a "0"/"1" with a 50:50 chance; an alternative embodiment can be constructed based around overdriving a resistor or diode to take advantage of the electron noise to trigger a random event. Other techniques can be used for generating random data, particularly where a reduced level of security is acceptable—in such cases, some relaxation can be permitted on the randomness of the data allowing the use of pseudo random binary sequence generators which are well known in the art.

Where the secret random data is being received or being passed on via the classical data-transfer interface 12, it is highly desirable for the data to be encrypted (except possibly where a wired interface is being used to interface directly with OTP apparatus or a trusted data store). The encryption should not, of course, be based on the Vernam cipher using existing OTP data from the memory 13 since in this case as least as much OTP data would be consumed as newly provisioned; however the existing OTP data can be used to form a session key for the (relatively) secure transfer of the new secret random data.

It will be appreciated that the level of security that applies to the sharing of secret random data between the device 10 and other OTP apparatus sets the maximum level of security that can be achieved using a one-time pad formed from this data; accordingly, if the user of the device 10 wishes to use the OTP data held in the device 10 to achieve very high levels of security for data transfer from the device, then the initial sharing of the secret random data must involve corresponding levels of security; however, if the OTP data is only to be used for applications that do not warrant the highest levels of security, then the security surrounding secret random data sharing can be relaxed.

It will also be appreciated that the sharing of the secret random data used for the one-time pads is generally restricted to entities that know something about each other (such as their respective identities or some other attribute); accordingly, the sharing of the secret random data will normally be preceded by a verification or qualification process during which each entity satisfies itself that the other entity possesses appropriate attributes. This applies not only for the OTP device 10 and the complementary OTP apparatus 20, but also to the trusted data store 21 and the trusted random data generator 24 which should check the attributes of any entity purporting to entitled to receive OTP data before such data is passed on to that entity.

The provisioning block 14 can simply append newly-obtained secret random data to the existing OTP data in memory 13 or can combine the new secret random data with the existing OTP data using a merge function, the merged data then replacing the previous contents of the memory 13. Preferably, the merge function is such that an eavesdropper who has somehow managed to obtain knowledge of the new secret random data, cannot derive any part of the merged data without also having knowledge of the pre-existing OTP data in the memory 13. A wide range of possible merge functions exist including functions for encrypting the new secret random data using the existing OTP data for the encrypting key, and random permutation functions (it will be appreciated that whatever merge function is used, it must be possible for the complementary OTP apparatus to select and use the same function on its copy of the new secret random data and its existing OTP data). Merging of the new secret random data and existing OTP data otherwise than by aggregation, can only be done if the device 10 and the complementary OTP apparatus have the same existing OTP data which should therefore be confirmed between the device and apparatus before the new secret random data and existing OTP data are subject to merging. In this respect, it will be appreciated that the OTP device 10 and the complementary OTP apparatus may not have the same existing OTP data for a variety of reasons such as a failed communication between the device and apparatus resulting in one of them consuming OTP data but not the other. Of course, it will frequently be possible for the OTP device and the complementary OTP apparatus to cooperate such that if either of them still has OTP data already discarded by the other, then that entity also discards the same data (one method of doing this is described later). However, it will not always be possible for the device 10 and the complementary OTP apparatus to cooperate in this way, or even check whether they have the same existing OTP data, at the time that one or other of the device and apparatus is provided with new secret random data—for example, if the OTP device is being replenished with new secret random data by communication with a trusted random data generator, it may well be that the trusted random data generator is not concurrently in communication with the OTP apparatus, the new secret random data only being subsequently shared with the OTP apparatus. In this type of situation, the new secret random data must be appended to the existing OTP data rather than being merged with it.

OTP Consumption Block 15

The OTP consumption block 15 is arranged to carry out tasks ('applications') that require the use ('consumption') of OTP data from the memory 13; it is to be understood that, unless otherwise stated herein, whenever data is used from the OTP data held in memory 13, that data is discarded. As already indicated, the OTP consumption block 15 is preferably provided by arranging for the main processor of the device 10 to execute OTP application programs; however, the consumption block 15 can additionally/alternatively comprise specialized hardware processing elements particularly where the OTP application to be executed involves complex processing or calls for high throughput.

A typical OTP consumption application is the generation of a session key for the exchange of encrypted messages with the complementary OTP apparatus; in this case, the complementary OTP apparatus can generate the same session key itself. Of course, the device 10 can securely communicate with the complementary OTP apparatus by encrypting data to be sent using the Vernam cipher—however, this would require the use of as much OTP data as there was data to be exchanged and so give rise to rapid consumption of the OTP data from memory 13.

Another OTP consumption application is the evidencing that the device 10 (or its owner/user) possesses a particular attribute. As already noted, the distribution of the secret random data used for the one-time pads is generally restricted to entities that know something about each other, such as their respective identities or the possession of other particular attributes (in the present specification, reference to attributes possessed by an entity includes attributes of a user/owner of the entity). An example non-identity attribute is an access authorisation attribute obtained following a qualification process that may involve the making of a payment. The secret random data will only be shared after each entity (or a trusted intermediary) has carried out some verification/qualification process in respect of the identity or other attributes of the other entity concerned. This verification/qualification can simply be by context (a bank customer replenishing their device 10 from an OTP apparatus within a bank may be willing to accept that the secret random data being received is shared only with the bank); however, verification/qualification can involve checking of documentary evidence (for example, a paper passport), or an automatic process such as one based on public/private keys and a public key infrastructure. Whatever verification/qualification process is used to control the sharing of secret random data, once such sharing has taken place, OTP data based on the secret random data can be used to prove the identity or other attributes of the possessor of the OTP data. Thus, for example, if OTP apparatus knows that it shares OTP data with an OTP device 10 with identity "X", then the device 10 can identify itself to the complementary OTP apparatus by sending it a data block from the top of its one-time pad; the apparatus then searches for this data block in the one or more OTP pads it possesses and if a match is found, it knows that it is communicating with entity "X". To aid finding a match, the device 10 preferably sends the OTP apparatus an identifier of the one-time pad that the device is proposing to use.

As already noted, communication failures and other issues can result in different amounts of OTP data being held by the OTP device 10 and the complementary OTP apparatus; more particularly, the data at the top of the one-time pad held by device 10 can differ from the data at the top of the one-time pad held by the complementary OTP apparatus. This is referred to herein as "misalignment" of the one-time pads. It is therefore convenient for the OTP device and the complementary OTP apparatus to each obtain or maintain a measure indicating how far it has progressed through its OTP data; this measure can also be thought of as a pointer or index to the head of the OTP pad and is therefore referred to below as the "head index". Preferably, the head index is taken as the remaining size of the OTP data; although other measurements can be used for the head index (such as how much OTP data has been used), measuring the remaining size of the OTP data can be done at any time and so does not require any on-going maintenance. Whatever actual numeric value of the measure used for the head index, in the present specification the convention is used, when discussing head index values, that the nearer the top of the one-time pad is to the bottom of the pad, the "lower" is the value of the head index.

The head index is used to correct for misalignment of the one time pads held by the device 10A and the complementary OTP apparatus as follows. At the start of any OTP interaction, the device 10 and complementary OTP apparatus exchange their head indexes and one of them then discards data from the top of its one-time pad until its head index matches that received from the other—that is, until the one-time pads are back in alignment at the lowest of the exchanged head index values. When OTP data is used by the device or apparatus in conducting the OTP transaction, the head index is sent along with the OTP interaction data (e.g. an OTP encrypted message) to enable the recipient to go directly to the correct OTP data in its one-time pad; this step can be omitted since although the one-time pads may have become misaligned by the time a message with OTP interaction data successfully passes in one direction or the other between the device and apparatus, this misalignment is likely to be small and a trial-and-error process can be used to find the correct OTP data at the receiving end.

The Complementary OTP Apparatus

With regard to the complementary OTP apparatus with which the OTP device 10 shares the same OTP data and can therefore conduct an OTP-based interaction, this can be constituted by apparatus in which all three functions of OTP storage, provisioning, and consumption are contained within the same item of equipment (as with the device 10); such OTP apparatus is referred to herein as "self-contained" OTP apparatus. However, it is also possible for the complementary OTP apparatus to be distributed in form with one of the OTP storage, provisioning, and consumption functions being in a separate item of equipment from the other two, or with all three functions in separate items of equipment to the OTP storage and provisioning functions; such OTP apparatus is referred to herein as "distributed" OTP apparatus. In distributed OTP apparatus it is, of course, necessary to ensure an adequate level of security for passing OTP data between its distributed functions. It is conceivable that one or both of the provisioning and consumption functions are provided by equipment that is also used by another distributed OTP apparatus.

Figure 3:
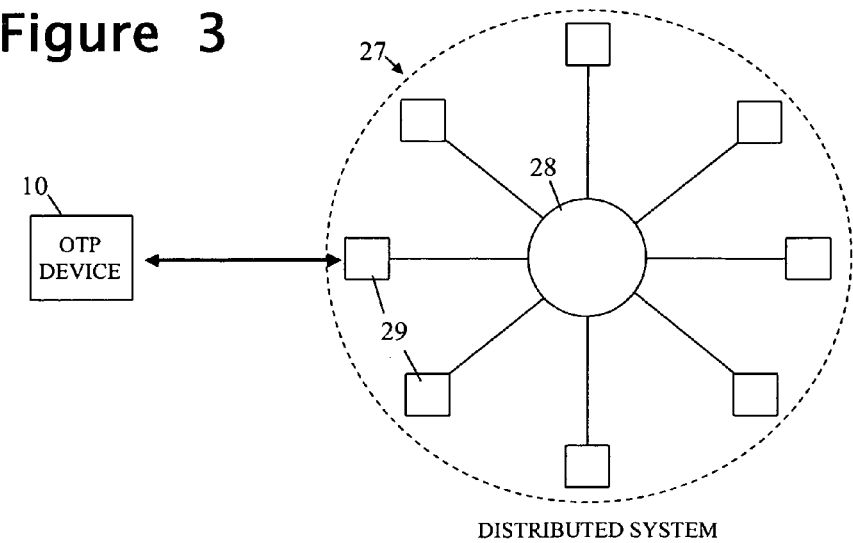
FIG. 3 is a diagram depicting a user OTP device interacting with a distributed data processing system.

To illustrate the different roles that self-contained and distributed OTP apparatus can play, FIG. 3 shows the OTP device 10 conducting an OTP interaction with a distributed data processing system 27 such as a banking system. The distributed system 27 comprises a central computer facility 28 that communicates with a plurality of customer-interfacing units 29 by any suitable communications network. The device 10 can communicate with one or more of the units 29 using its classical data-transfer interface 12.

In one possible scenario, each of the units 29 is a self-contained OTP apparatus holding OTP data that is distinct from the OTP data held by any other unit 29; in this case, assuming that the device 10 only holds one pad of OTP data, it is restricted to interacting with the unit 29 that holds the same pad. Alternatively, the OTP device 10 can be arranged to hold multiple pads of OTP data each corresponding to a pad held by a respective one of the units 29, the device 10 then needing to use data from the correct pad for the unit 29 with which it wishes to conduct an OTP interaction.

In an alternative scenario, the central computer facility 28 is a self-contained OTP apparatus, the device 10 conducting the OTP interaction with the facility 28; in this case, each of the units 29 is simply a communications relay for passing on the OTP interaction messages.

In a further alternative scenario, the central computer facility 28 holds the OTP data shared with the device 10 but the units 29 are consumers of that data; in this case, the device 10 conducts the OTP interaction with one of the units, the unit obtaining the needed OTP data from the facility 28 over the internal network of the distributed system. In this scenario, the distributed system 27 forms a distributed OTP apparatus.

It may be noted that in the last scenario, it is possible to arrange for each of the units 29 to be capable of taking part in an OTP provisioning operation with the device 10, either by passing on to the central computer facility 28 secret random data provided by the device 10, or by generating random data and passing it both to the device 10 and to the central facility 28; in this latter case, the units 29 independently generate their random data.

Whatever the form of the complementary OTP apparatus, it may have been designed to carry out OTP interactions with multiple different devices 10, each with its own OTP data. This requires that the complementary OTP apparatus hold multiple different pads of OTP data, one for each device 10 with which it is to conduct OTP interactions; it also requires that the OTP apparatus uses the correct OTP data when interacting with a particular OTP device 10. One way of enabling the OTP apparatus to determine quickly which is the correct pad of OTP data to use in respect of a particular device 10, is for each pad to have a unique identifier which the device sends to the apparatus when an OTP interaction is to be conducted. It is not necessary for this identifier to be sent securely by the device 10 (unless there are concerns about an eavesdropper tracking patterns of contact between particular devices and the apparatus).

Multiple Pads with Different Security Levels

Figure 4:
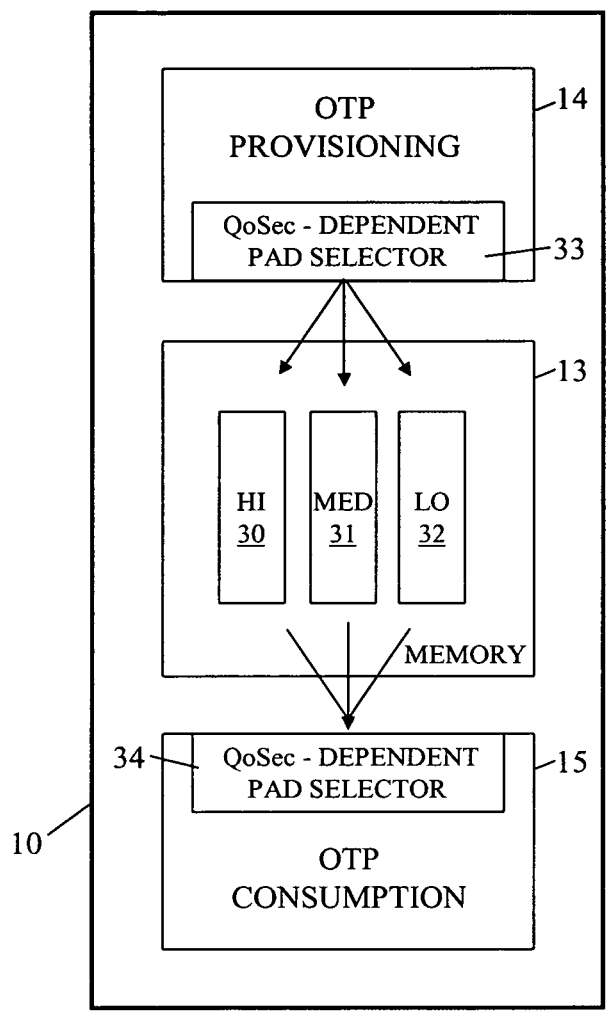
FIG. 4 is a diagram illustrating multiple one-time pads of different security rating in a user OTP device.

FIG. 4 depicts an embodiment of the device 10 that has multiple one-time pads 30, 31, 32 in its OTP memory 13. It should be noted that in FIG. 4, certain of the functional blocks of device 10 have not been shown for reasons of clarity.

Each pad 30, 31, 32 holds OTP data rated at a particular quality of security ("QoSec") level that is different for each pad; in particular, pad 30 holds OTP data with a high QoSec level, pad 31 holds OTP data with a medium QoSec level, and pad 32 holds data with a low QoSec level. Newly-obtained secret random data is allocated by a pad selector 33 of the provisioning block 14 to one of the pads 30, 31, 32 according to a QoSec level associated with the new secret random data; once assigned to a pad 30, 31, 32, the new secret random data is either appended to, or merged with, any existing data of the assigned pad as described above in connection with operation of the provisioning block 14.

The QoSec level associated with new secret random data is dependent on the process used to obtain this data and/or on parameters related to that process. For example, a high QoSec level is associated with new secret random data shared using QKD, or a wired, point-to-point, connection directly with trusted apparatus in a secure environment, or escorted transfer of secure media;

a medium QoSec level is associated with new secret random data shared using an IrDA interface to trusted apparatus in a secure environment;

a low QoSec level is associated with new secret random data shared using an encrypted radio interface where the encryption is of at least a certain minimum security level.

In fact, not all QKD-shared secret random data will necessarily be associated with a high QoSec level since the security of QKD-shared random data depends in part on a process known as "privacy amplification" which effectively reduces the number of bits available as will be more fully explained below in connection with the embodiment of the device 10 illustrated to FIG. 5.

It will be appreciated that the provisioning block 14 will either itself have direct knowledge of, or will be informed by the communications interface 12 of, the nature and/or security-related parameter values of the process used to obtain the new secret random data. Furthermore, the provisioning block 14 is arranged to store data indicative of the QoSec level of each process, taking into account the current values of any specified security-related parameters of the process.

Typically, the provisioning block 14 of the OTP device 10 is capable of obtaining new secret random data using a range of different processes and the user selects which process is used, albeit that this selection may be constrained by the context in the user and device are currently situated. In the above description of an OTP device 10 with multiple one-time pads 30, 31, 32, selection of the pad to be provisioned with OTP data using newly-obtained secret random data, followed the selection of the process to be used for obtaining the new secret random data. In fact, it is also possible to work the other way around with the process to be used to obtain the new secret random data being selected to have a QoSec level corresponding to the QoSec level of the pad it is desired to provision with OTP data.

Furthermore, it will be appreciated that regardless of whether the pad to be provisioned with OTP data using newly-obtained secret random data is matched to the process used to obtain the new secret random data or whether the process to be used for obtaining new secret random data is matched to the pad to be provisioned with OPT data using the new secret random data, the relationship between the QoSec levels of the process and pad is not limited to one of equality since security will not be compromised if the process for obtaining the secret random data has a higher QoSec level than the pad to be provisioned with new OTP data using the new secret random data.

Thus, in general terms, the provisioning block 14 serves to match one of the pad to be provisioned with OTP data using new secret random data, and the process for obtaining the new secret random data, to the other of the pad and process such that the security rating of the process is as least as good as that of the pad.

In the FIG. 4 device 10, the OTP consumption block 15 is provided with a QoSec-dependent pad selector 34 the role of which is to select the OTP pad 30, 31, 32 to be used having regard to the security level desired for a particular OTP application about to be run. This security level can be pre-specified for the type of application concerned, user-selected at the time the application is to be run, set by the complementary OTP apparatus, or automatically selected by the selector 34 according to detected environmental characteristics (if the device recognises that it is in a secure environment, the selector 34 may choose to use a lower-security pad).

Preferably, each of the pads is individually identified and this identity is passed to the complementary OTP apparatus when conducting an OTP interaction.

The above-described pad alignment mechanism, if employed, is used independently for each of the pads 30, 31, 32.

It will be appreciated that the number of QoSec levels can be greater or less than the three levels described above with reference to FIG. 4.

An embodiment of the OTP device 10 will now be described, with reference to FIG. 5, in which the provisioning block 14 comprises a QKD subsystem 18 arranged to interact with a QKD subsystem of a complementary OTP apparatus 20 to share new secret random data in order to provision corresponding one-time pads held in OTP memory 13 of device 10 and OTP memory 92 of apparatus 20. In the present embodiment, the device OTP memory 13 and the apparatus OTP memory 92 each hold three one-time pads, namely: corresponding high-security one-time pads 30 and 93 respectively, corresponding medium-security one-time pads 31 and 94 respectively, and corresponding low-security one-time pads 32 and 94 respectively.

Figure 5:
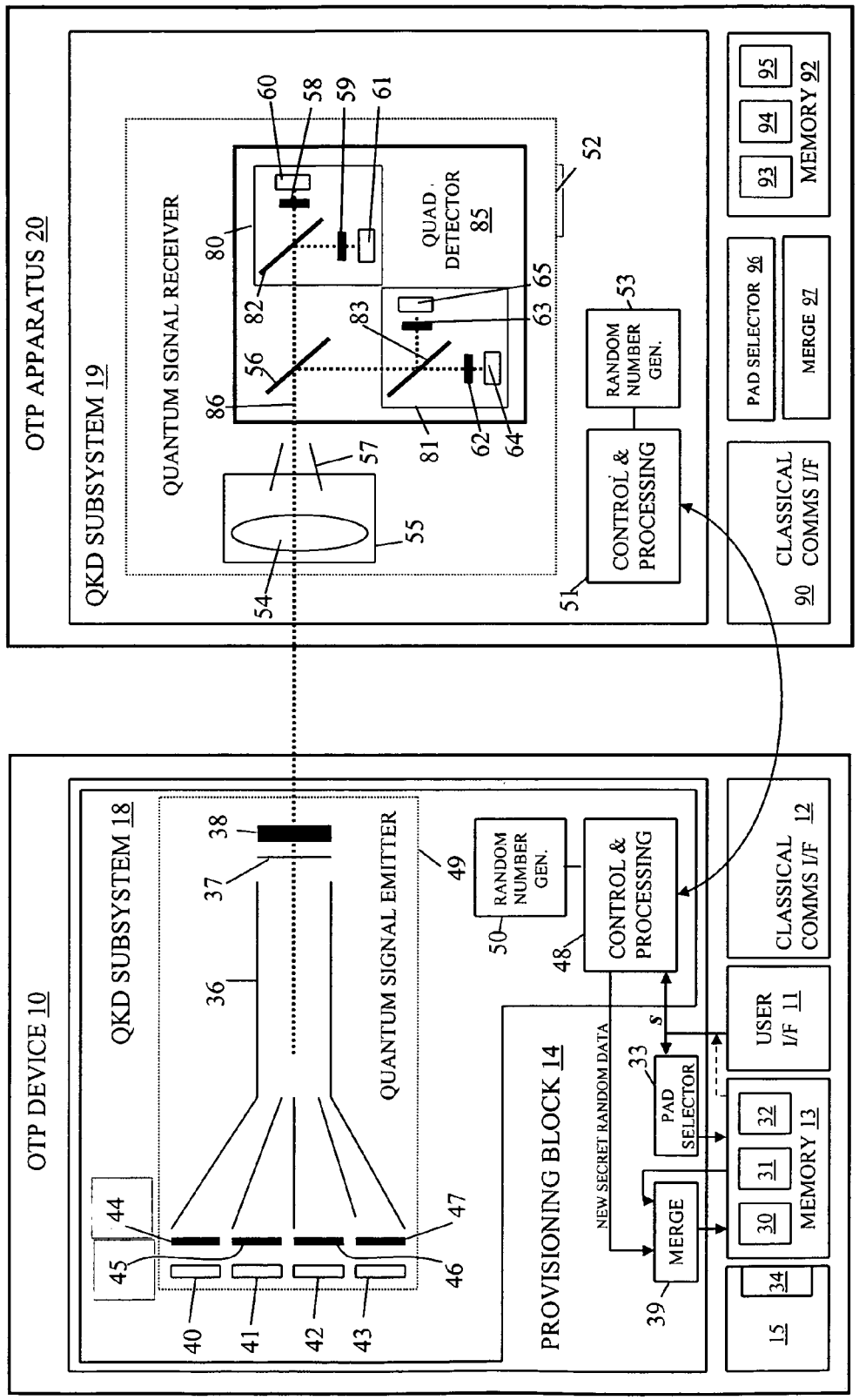
FIG. 5 is a diagram illustrating an embodiment of the FIG. 1 user OTP device sharing secret random data with complementary OTP apparatus by a quantum key distribution method.

It should be noted that in FIG. 5 only those components of the apparatus 20 relevant to the provisioning of OTP data have been shown.

The QKD subsystem 18 of the OTP device 10 comprises a quantum signal emitter 48, a control-and-processing functional block 49 (typically implemented by programs running on the main processor of the device 10), and a random number generator 50. The QKD subsystem 19 of the OTP apparatus 20 comprises a quantum channel receiver 51, a control-and-processing functional block 52 (typically implemented as a program-controlled processor), and a random number generator 53.

When the quantum signal emitter 49 of the device 10 is correctly aligned with the quantum signal receiver 51 of the apparatus 51 a quantum signal channel can be established between the emitter 49 and receiver 51 (correct alignment of the emitter and receiver is achieved, for example, by placing the device in a cradle fixed relative to the apparatus 20). The control-and-processing block 48 of the device QKD subsystem 18 can communicate with the control-and-processing block 52 of the apparatus QKD subsystem 19 via a classical communication channel established between the classical communications interface 12 of the device 10 and a complementary classical communications interface 90 of the apparatus 20. As will be more fully described below, a primary purpose of the communication between the control-and-processing blocks 48 and 52 via the classical communication channel is to effect error correction on the secret random data shared between the device 10 and apparatus 20 via the quantum signal channel.

Considering the quantum signal emitter in more detail, this emitter 49 comprises an array of light emitting diodes (LEDs) 40, 41, 42 and 43. In front of each LED 40, 41, 42 and 43 is a respective polarizing filter 44, 45, 46, 47. Filter 44 polarizes the photons emitted from LED 40 vertically, filter 45 polarizes the photons emitted from LED 41 horizontally, filter 46 polarizes the photons emitted from LED 42 diagonally and filter 47 polarizes the photons emitted from LED 43 anti-diagonally (the directions of polarization are stated relative to an intended orientation of the device 10 when in use). Thus, after passing through the filters 44, 45, 46, 47, the photons are polarized in four directions, each at 45° to another thus providing two pairs of orthogonal polarizations. The LEDs 40, 41, 42 and 43 are narrow frequency emitters such as those available from Agilent Technologies, Inc. of 395 Page Mill Rd, Palo Alto, Calif. 94306, United States e.g., one of the Sunpower series, emitting at 590 nm or 615 nm.

A fiber optic light guide 36 is provided to convey the polarized photons to an attenuation filter 37 and narrow band pass frequency filter 38. The purpose of the attenuation filter 37 is to reduce the number of photons emitted and the frequency filter 38 is to restrict the emitted photons to a narrow frequency range (typically plus or minus 1 nm). Without the attenuation filter 37 in place the number of photons emitted per LED pulse would be of the order of one million. With the filter in place, the average emission rate is 1 photon per 100 pulses. Importantly this means that more than one photon is rarely emitted per pulse. The attenuation filter 37 and frequency filter 38 can be combined in a single unit if preferred. A spatial filter is provided to limit light leakage outside the channel.

The quantum signal receiver 51 comprises a lens 54, a quad-detector arrangement 85, and a fiber optic light guide 57 for conveying photons received through the lens 54 to the quad-detector arrangement 85. The quad-detector arrangement 85 comprises a beam splitter 56, a first paired-detector unit 80, and a second paired-detector unit 81. The first paired-detector unit 80 comprises a beam splitter 82, polarizers 58, 59, and detectors 60, 61. The second paired-detector unit 81 comprises a beam splitter 83, polarizers 62, 63, and detectors 64, 65. The polarizers 58, 59 of the first paired-detector unit 80 have their directions of polarization orthogonal to each other; similarly, the polarizers 58, 59 of the second paired-detector unit 81 also have their directions of polarization orthogonal to each other. The polarization directions of the polarizers of the first paired-detector unit 80 are at 45° to the polarization directions of the polarizers of the second paired-detector unit 81. The beam splitters 56, 82 and 83 are depicted in FIG. 5 as half-silvered mirrors but can be of other forms such as diffraction gratings.

The detectors 60, 61, 64, 65 are avalanche photo-diodes, such as those available from Perkin Elmer Optoelectronics of 22001 Dumberry Road, Vaudreuil, Quebec, Canada, J7V 8P7 types C30902E, C30902S, C30921E and C30921S.

Dotted line 86 depicts the paths of photons passing through the lens 54 to the detectors 60, 61, 64 and 65 of the quad-detector arrangement 85.

Figure 6:
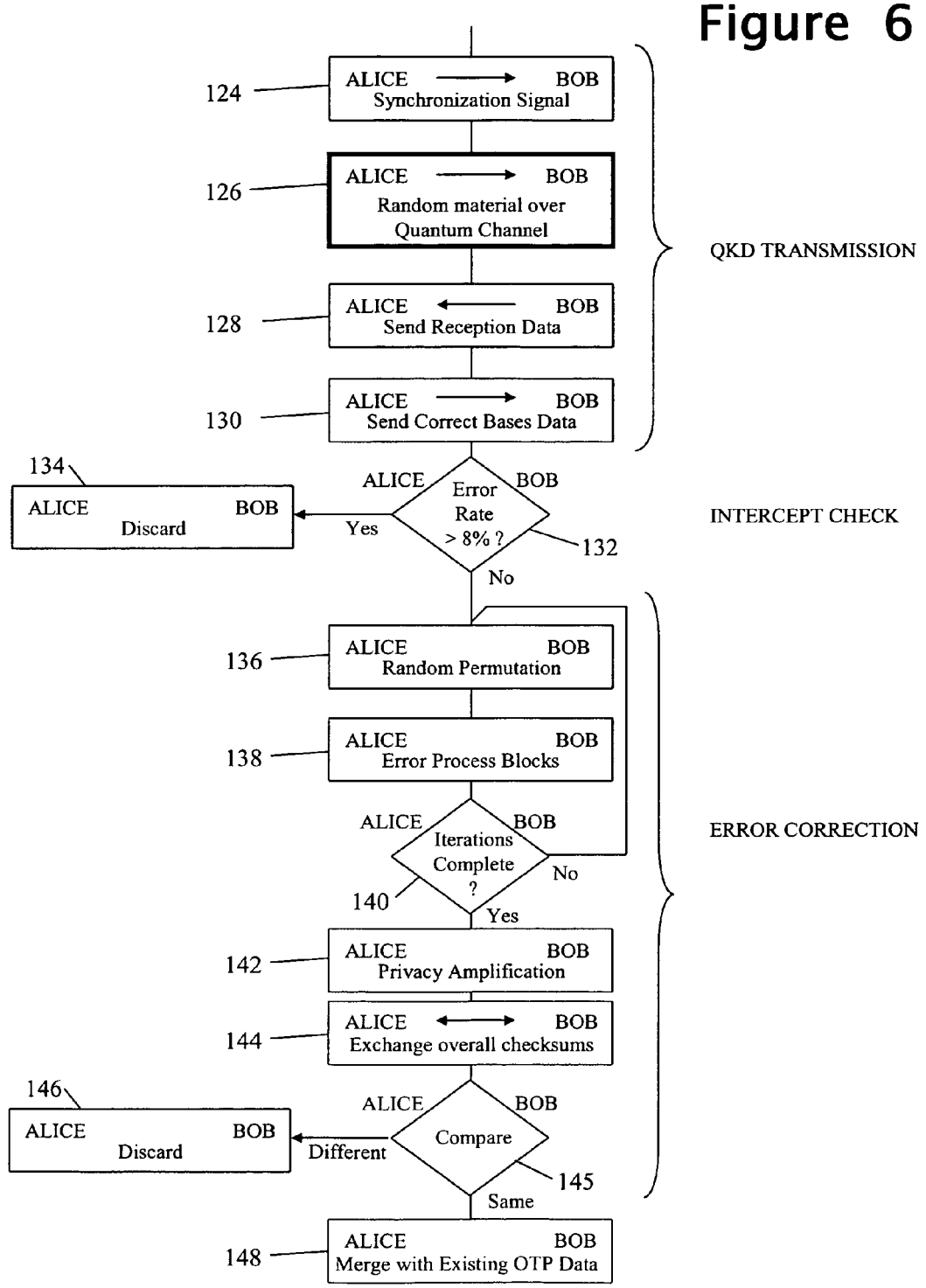
FIG. 6 is a functional flow diagram illustrating a method of operation of the OTP device and apparatus shown in FIG. 5.

Operation of the FIG. 5 arrangement will now be described with reference to the functional flow diagram of FIG. 6. It will be appreciated that this operation is controlled by the control-and-processing blocks 48 and 52 of the device 10 and apparatus 20 respectively, these blocks also carrying out the processing of the secret random data shared via the quantum signal channel. In the following, the convention is used that the emitting side for the quantum signal (device 10) is referred to as 'Alice' and the receiving side (apparatus 20) as 'Bob'. In FIG. 6, the appearance of the name of Alice and/or Bob in block capitals in relation to a particular step indicates the active involvement of Alice and/or Bob, as the case may be, in that step.

It is assumed that a quantum signal channel has been established between the quantum signal emitter 49 of device 10 and the quantum signal receiver 51 of apparatus 20. The transfer of random secret information based on quantum cryptography is thereafter carried out using a variant of the BB84 quantum coding scheme. The specific algorithm used is described below.

Alice and Bob have a predetermined agreement as to the length of a time slot in which a unit of data will be emitted. To achieve initial synchronization, Alice in step 124 (see FIG. 6)

uses the quantum signal channel to produce a "START" synchronization signal (for example, by briefly over-driving one of the LEDS 40-43 to produce a photon burst).

In step 126, Alice randomly generates a multiplicity of pairs of bits, typically of the order of $10^8$ pairs. Each pair of bits consists of a message bit and a basis bit, the latter indicating the pair of polarization directions to be used for sending the message bit, be it vertical/horizontal or diagonal/anti-diagonal. A horizontally or diagonally polarized photon indicates a binary 1, while a vertically or anti-diagonally polarized photon indicates a binary 0. The message bit of each pair is thus sent over the quantum signal channel encoded according to the pair of polarization directions indicated by the basis bit of the same pair. Randomness in generating the pairs of bits is achieved by use of the random number generator 50 which, in the present embodiment, is a hardware random number generator such as a quantum-based arrangement in which a half-silvered mirror is used to pass/deflect photons to detectors to correspondingly generate a "0"/"1" with a 50:50 chance; an alternative form of random number generator can be constructed based around overdriving a resistor or diode to take advantage of the electron noise to trigger a random event.

When receiving the quantum signal from Alice, Bob randomly chooses (using the random number generator 53) which basis (pair of polarization directions) it will use to detect the quantum signal during each time slot and records the results.

The sending of the message bits of the randomly-generated pairs of bits is the only communication that need occur using the quantum channel. The remainder of the algorithm is carried out using the classical channel.

In step 128, Bob informs Alice of the time slots in which a signal was received and the basis (i.e. pair of polarization directions) thereof.

In step 130, Alice sends to Bob confirmation of which of those bases is correct. Alice and Bob then use the bits corresponding to the time slots where they used the same bases, as the initial new shared secret random data. However, there may well be discrepancies (errors) between the versions of the new secret random data held by Alice and Bob due, for example, to noise in the quad detector arrangement 85.

In step 132, error rate checking is carried out by Alice and Bob comparing their versions of a selected subset of the initial new secret random data. The higher the error rate, the greater the probability is that the quantum signal has been intercepted. Error rates above about 12% are generally unacceptable and, preferably, an upper threshold of 8% is set since above this figure the number of bits available after error correction and privacy amplification is too low.

If the error rate is found to be greater than the 8% threshold, the session is abandoned and the new secret random data is discarded (step 134).

If the error rate is below the 8% threshold, error correction is then carried out on the initial new secret random data (after the latter have been reduced by discarding the subsets used for error rate determination).

Error correction is effected using a version of the CASCADE algorithm in which two basic steps 136, 138 are repeated until a stable condition is reached (typically after six or seven iterations); alternatively, and as indicated by step 140 in FIG. 6, the number of iterations can be fixed. The two basic steps are:

(1) A preliminary step 136 in which Alice and Bob effect the same random permutation of their respective versions of the new secret random data. This is done as follows. Alice and Bob use the same subset of bits (typically 64 bits) of their new secret random data as a seed for a deterministic pseudo random number generator. This pseudo random number generator is used to permute the data. This way both Alice and Bob will permute their data in the same way. The secret random data is then reduced by the subset used as the seed for the random number generator. This permutation step is designed to do two things—it uniformly redistributes the bits in error and also make life difficult for external observers (who do not know how the bits are being redistributed).

The remaining new secret random data is then treated as if divided into blocks of a size chosen such that for the measured error rate each block has, on average, one error.

(2) An error elimination step 138 in which Alice and Bob process each block of their respective versions of the secret random data as follows. Both Alice and Bob determine the parity of the block and Bob sends its parity value to Alice. If Alice finds that Bob's parity value is the same value as Alice has determined for her block, that block is accepted as error free (although it could have any even number of errors); if Alice finds that her parity value differs from Bob's, the block is assumed to have one error (though it could have any odd number of errors); in this case, a binary search process is followed to track down the error. This search process involves the steps of halving the block in error, and determining which half contains the error by Bob sending Alice the parity of one of the half blocks which Alice compares with her parity value for the corresponding half block in her possession; if the parity values differ, the errored half block is the one being processed whereas if the parity values are the same, the errored half block is the one not being processed. The foregoing steps are then repeated for the errored half block and so on until the errored bit is identified. The errored bit is then either discarded or Bob flips the value of his version of the bit.

The above-described error correction process will generally achieve an error level of $1:10^6$ or better which is sufficient for present purposes.

However, it will be appreciated that the error correction process involves the exchange of considerable amounts of parity information between Bob and Alice which is potentially of use to an eavesdropper. It is also to be noted that although the error-rate-based intercept check carried out in step 132 will detect interception of any substantial portion of the quantum signal transmission, an eavesdropper may still be able to successfully intercept a small number of bits of the quantum signal as there will be a finite (though very small) probability that more than one photon is sent during a time slot over the quantum channel thereby leaving open the possibility that an eavesdropper with a beam splitter can capture one photon while allowing Bob to receive the other photon. Accordingly, a privacy amplification step 142 is next performed. In this step both Alice and Bob reduce the size of their respective versions of the new secret random data using a deterministic randomizing permutation, the reduction in size being dependent on the amount of parity information exchanged and the level of security required.

A detailed discussion of privacy amplification can be found, for example, in the paper "Generalized Privacy Amplification", C. H. Bennett, G. Brassard, C. Crepeau, and U. M. Maurer; IEEE transactions on Information Theory, IT-41 (6), p 1915-1923. In general terms, it can be said that if the new secret random data x has a length of n bits after error correction, and the eavesdropper has at most k deterministic bits of information about the new shared secret, then if an appropriate class of hash function h( ) is applied to the secret random data:

$$\{0,1\}^n \rightarrow \{0,1\}^{n-k-s}$$

where s is a safety parameter and $0 < s < n-k$, the eavesdropper's expected information on h(x) is no more than $(2^{-s}/\ln 2)$ bit. Thus, varying the value of (n−k−s) gives different levels of security for the result of the hash of x; in particular, increasing s increases the level of security. The value of k is generally constrained by the system characteristics and the value of n.

In the present embodiment, the value of the safety parameter s can be set by a user via the user interface 11 of the device 10, this value being transmitted by the control-and-processing block 48 of the device 10 to the control-and-processing block 51 of the apparatus 20 so that the device 10 and apparatus 20 are both using the same value of s when effecting privacy amplification. If the user has failed to set a value for s, a default value is used.

After the error correction and privacy amplification, Alice and Bob are very likely to have the same result. However, in step 144 Alice and Bob seek to re-assure themselves that this is the case by exchanging a hash of their new secret random data. If the hashes differ (checked in step 145), the new secret random data is discarded (step 146).

If the checksums are the same, Alice and Bob each accept the new secret random data and use it to provision a selected one of their one-time pads by merging the new secret random data with any existing OTP data in the selected pad (step 148). Pad selection is effected by pad selector 39 of device 10 and pad selector 96 of apparatus 20, both pad selectors 39 and 96 making their selection based on the value of the safety parameter s used during the privacy amplification step 142. The pad selectors are, of course, set so that they choose pads with corresponding security levels regardless of the value of s. Thus, if the value used for s is relatively high, the new secret random data is merged into the high-security pads 30 and 93; if the value of s is relatively low, the new secret random data is merged into the low-security pads 32 and 95; and for intermediate values of s, the new secret random data is merged into the medium-security pads 31 and 94.

The merging of the new secret random data with the existing OTP data of the selected pads is effected by merge functional blocks 39 and 97 of the device 10 and apparatus 20 respectively.

As an alternative to the value of the safety parameter s being set by the user, the value of s can be automatically set according to which of the pads 30, 31, 32 is to be re-provisioned (for example, the pad most in need of re-provisioning). Another possibility is to use contextual inputs to set the value of s—thus, if the device 10 is aware that it is in an environment in which it will need to carry out highly secure OTP interactions, then the device 10 can be arranged to set a high value of s.

It will be appreciated that many variants are possible to the above described embodiments of the invention.

For example, although in the foregoing, embodiments of the invention have been described in relation to an OTP device that incorporates, in a self-contained form, OTP storage, provisioning, and consumption, it is to be understood that the device could generally be replaced by a distributed arrangement of its functional blocks.

In order to reduce the need to effect re-provisioning of the OTP devices and OTP apparatus with secret random data, it is possible to arrange for devices to consume their one-time pad data more than once where the security requirements permit such a reduction in the level of security. Such "n-time" use of the OTP data does not change the character of the secret random data subject to distribution or of the resulting OTP data and the accompanying claims are to be understood accordingly.

The invention claimed is:

1. A method of managing a device arranged to carry out security-related tasks using one-time pad data, the method comprising:
   holding a plurality of one-time pads, each pad having a different security rating and being intended for use by the device in executing a task to that security rating,
   obtaining new secret random data by a process with an associated security rating; and
   using the new secret random data to provision a particular said one-time pad with one-time pad data;
   the method further comprising matching one of said particular one-time pad and said process such that the security rating of said process is as least as good as that of said particular one-time pad.

2. A method according to claim 1, wherein the particular one-time pad is matched to said process by the particular one-time pad being selected on the basis of the security rating of the process used to obtain the secret random data.

3. A method according to claim 1, wherein following identification of said particular one-time pad, said process is matched to this pad by said process being chosen or set up such that it has an appropriate security rating relative to that of said particular one-time pad.

4. A method according to claim 1, further comprising choosing said process for obtaining the new secret random data from at least two of the following processes:
   a quantum key distribution process;
   a wired, point-to-point, data transfer process;
   an encrypted wireless data transfer process;
   a physical media transfer process.

5. A method according to claim 1, wherein said process is a quantum key distribution process, herein a QKD process; the security rating of the QKD process being determined by the value of a safety parameter used during a privacy amplification procedure of the QKD process.

6. A method according to claim 5, wherein the security rating of the QKD process is set by a user setting the value of said safety parameter, and said particular one-time pad is automatically selected from said plurality of one-time pads as a said pad which has a security rating no better than the security rating of the QKD process.

7. A method according to claim 5, wherein following identification of said particular one-time pad, the value of the safety parameter used in the QKD process is automatically set to result in a security rating of the process at least as good as that of said particular one-time pad.

8. A method according claim 1, wherein the new secret random data is used to provision said particular one-time pad with one-time pad data by merging the new secret random data with any pre-existing one-time pad data of that pad according to a predetermined merge function, the merge function being such that a party with knowledge of the new secret random data, cannot derive any part of the merged data without also having knowledge of the pre-existing one-time pad data.

9. A method according to claim 1, wherein upon the device executing a said task, the one-time pad data to be used in executing the task is taken from the one-time pad that has a security rating corresponding to that pre-specified for the type of the task concerned.

10. A method according to claim 1, wherein upon the device executing a said task, the one-time pad data to be used in executing the task is taken from the one-time pad that has a security rating corresponding to a security rating chosen by a user of the device for executing the task.

11. A device comprising:
- a memory for holding multiple one-time pads each with a different security rating,
- a provisioning arrangement for carrying out a process to obtain new secret random data and for using this data to provision a particular said one-time pad with one-time pad data, the provisioning arrangement being arranged to match one of said particular one-time pad and said process such that the security rating of said process is as least as good as that of said particular one-time pad; and
- a consumption arrangement for carrying out a security-related task using a said one-time pad with a security rating suitable for said task.

12. A device according to claim 11, wherein the provisioning arrangement is arranged to match particular one-time pad to said process by selecting the particular one-time pad on the basis of the security rating of the process used to obtain the secret random data.

13. A device according to claim 11, wherein the provisioning arrangement is arranged to match said process to said particular one-time pad by choosing or setting up said process such that it has an appropriate security rating relative to that of said particular one-time pad.

14. A device according to claim 11, wherein the device is adapted to enable said new secret random data to be obtained by at least two of the following processes:
- a quantum key distribution process;
- a wired, point-to-point, data transfer process;
- an encrypted wireless data transfer process;
- a physical media transfer process;
- the process to be used to obtain said new secret random data being user selectable from the processes for which the device is enabled.

15. A device according to claim 11, wherein the provisioning arrangement comprises a quantum key distribution subsystem, herein QKD subsystem, for carrying out said process; the security rating of the process being determined by the value of a safety parameter used during a privacy amplification procedure which the QKD subsystem is arranged to carry out as part of said process.

16. A device according to claim 15, further comprising a user interface for enabling a user to set the security rating of said process by setting the value of the safety parameter, the provisioning arrangement being arranged to automatically select said particular one-time pad from said plurality of one-time pads as a said pad which has a security rating no better than the security rating of the QKD process.

17. A device according to claim 15, further comprising means for automatically setting the value of the safety parameter to result in a security rating of the process at least as good as that of said particular one-time pad.

18. A device according to claim 11, wherein the provisioning arrangement is arranged to use the new secret random data to provision said particular one-time pad with one-time pad data by merging the new secret random data with any pre-existing one-time pad data of that pad according to a predetermined merge function, the merge function being such that a party with knowledge of the new secret random data, cannot derive any part of the merged data without also having knowledge of the pre-existing one-time pad data.

19. A device according to claim 11, wherein the consumption arrangement is arranged, prior to executing a said task, to determine a security rating pre-specified for that type of task and to thereupon to use one-time data from the correspondingly rated pad in executing said task.

20. A device according to claim 11, further comprising a user interface for enabling a user to specify a security rating to be met when executing a said task, the consumption arrangement being arranged to execute said task using one-time data taken from the one-time pad that has a security rating corresponding to the one specified by the user.

* * * * *

UNITED STATES PATENT AND TRADEMARK OFFICE
CERTIFICATE OF CORRECTION

| | | |
|---|---|---|
| PATENT NO. | : 8,842,839 B2 | Page 1 of 1 |
| APPLICATION NO. | : 11/490853 | |
| DATED | : September 23, 2014 | |
| INVENTOR(S) | : Keith Alexander Harrison et al. | |

It is certified that error appears in the above-identified patent and that said Letters Patent is hereby corrected as shown below:

On the title page item (56), in OTHER PUBLICATIONS, line 1, delete "Crptology" and insert -- Cryptology --, therefor.

In the claims

In column 16, line 17, in Claim 1, delete "as least" and insert -- at least --, therefor.

In column 16, line 51, in Claim 8, delete "according" and insert -- according to --, therefor.

In column 17, lines 11-12, in Claim 11, delete "as least" and insert -- at least --, therefor.

Signed and Sealed this
Twenty-third Day of February, 2016

Michelle K. Lee
*Director of the United States Patent and Trademark Office*